United States Patent [19]

Crossley

[11] 4,265,766

[45] May 5, 1981

[54] CHICKEN MARINADE DRAINING SYSTEM

[76] Inventor: Leonard S. Crossley, 3218 Nebraska Ave., Council Bluffs, Iowa 51501

[21] Appl. No.: 94,385

[22] Filed: Nov. 15, 1979

[51] Int. Cl.³ ............................................. B01D 23/06
[52] U.S. Cl. ..................................... 210/455; 99/516; 210/474
[58] Field of Search ................. 99/485, 516; 210/455, 210/464, 465, 470, 473, 474, 476, 477, 478, 479, 498, 469

[56] References Cited

U.S. PATENT DOCUMENTS

| | | | |
|---|---|---|---|
| 2,625,270 | 1/1953 | DeArmas | 210/474 |
| 2,844,256 | 7/1958 | Campbell | 210/473 |
| 2,866,556 | 12/1958 | Hinz | 210/498 |
| 3,812,972 | 5/1974 | Rosenblum | 210/498 |

FOREIGN PATENT DOCUMENTS 554252  6/1923  France ..................................... 210/476

*Primary Examiner*—Ivars C. Cintins
*Attorney, Agent, or Firm*—Hiram A. Sturges

[57] ABSTRACT

A marinade draining system comprising an inner receptacle having draining slots in its bottom side inserted into an outer receptacle, side supports capable of maintaining the inner receptacle higher in the outer receptacle for draining and yet releasable for allowing the inner receptacle to be lower for marinating.

4 Claims, 4 Drawing Figures

CHICKEN MARINADE DRAINING SYSTEM

BACKGROUND OF THE INVENTION

Chicken and marinade are commonly kept together in a large container. Many dip their hands into the icy cold 35° Fahrenheit marinade to reach for chicken pieces which is unsanitary. Others drain off the marinade when the chicken is ready to be breaded. This draining is presently a difficult and time consuming process. Usually the container is held over a sink and the marinade is poured out while the lid of the container is used to hold back the chicken.

The marinade and chicken container is very heavy when full, hence it is difficult to lift and awkward to handle.

After the container has been lifted to the sink, there still remains the task of actually draining off the marinade This is a slow and tedious process.

First, the container needs to be held at an angle sufficient for the draining off of marinade. Second, the lid of the container needs to be held in such a way that an opening is formed which is large enough to allow marinade to escape while retaining the chicken inside the container. Third, the container needs to be held over the sink long enough to allow all of the marinade to drain out of the container.

It is often the case that the person marinating will purposely spill out the entire contents of the container into a sink, allowing the marinade to drain off. This could cause sanitary problems and could also break up the chicken pieces when they hit the sink. Marinade solution can be used any number of times in a 24-hour period. However, because no economical method has been found for retaining the marinade after it has once been used, a great deal of marinade is wasted down drains every day.

A problem has been in the breading of the marinated chicken. It is very common for those working at breading chicken not to drain the marinade out of the container at all. It is usually the case that the worker will simply grab out several pieces of chicken with his hands, let most of the marinade drain through his fingers, and then place the chicken on a breading table. When this is done, an extra amount of marinade is usually left on the chicken. The extra marinade causes the breading to "ball up" and become useless.

Breading is far more expensive than marinade, hence, wasted breading can add greatly to the cost of chicken preparation.

My invention is intended to solve all of those problems. The inner receptacle of my invention only needs to be lifted an easy and short distance in order to be mounted on the outer receptacle. The problems associated with the heaviness of the bulky filled containers is eliminated.

In my invention the holding of the container at an angle for a long and tedious draining time is eliminated.

In my invention the lid does not need to be held over a portion of the container top during draining.

In my invention, the marinade draining is all automatic in the sense that it is done by gravity without hand-holding of containers.

With my invention employees will be less tempted to dump chicken into a sink.

A further advantage of my drainer is that it provides an economical method of saving marinade solution so as to be reused later on.

A great deal of breading is also likely to be saved by those using my invention. No longer will employees be tempted to pull chicken out of the icy cold marinade by hand. Instead, they will find it easier to lift my inner container allowing the marinade to drain off first.

A particular objective of my invention is to provide the inner container with drain slots, rather than with drain holes. I experimented with drain holes and found they would not work because the meat tended to plug up the holes. I experimented with ½ inch wide slots which was better because the meat would not plug up the ½ inch wide slots. This had the disadvantage that chicken wing tips would wedge into the slots causing a time consumption in pulling them out by hand after they have been packed in by the weight of the meat in the load. I now use ¼ inch wide slots which is ideal for chicken and drains effectively.

SUMMARY OF THE INVENTION

The major goal of this invention is to provide a marinade draining system comprising an inner receptacle having draining slots in its bottom side inserted into an outer receptacle, side supports capable of maintaining the inner receptacle higher in the outer receptacle for draining and yet releasable for allowing the inner receptacle to be lower for marinating.

DESCRIPTION OF THE PREFERRED EMBODIMENT

Figure 1:
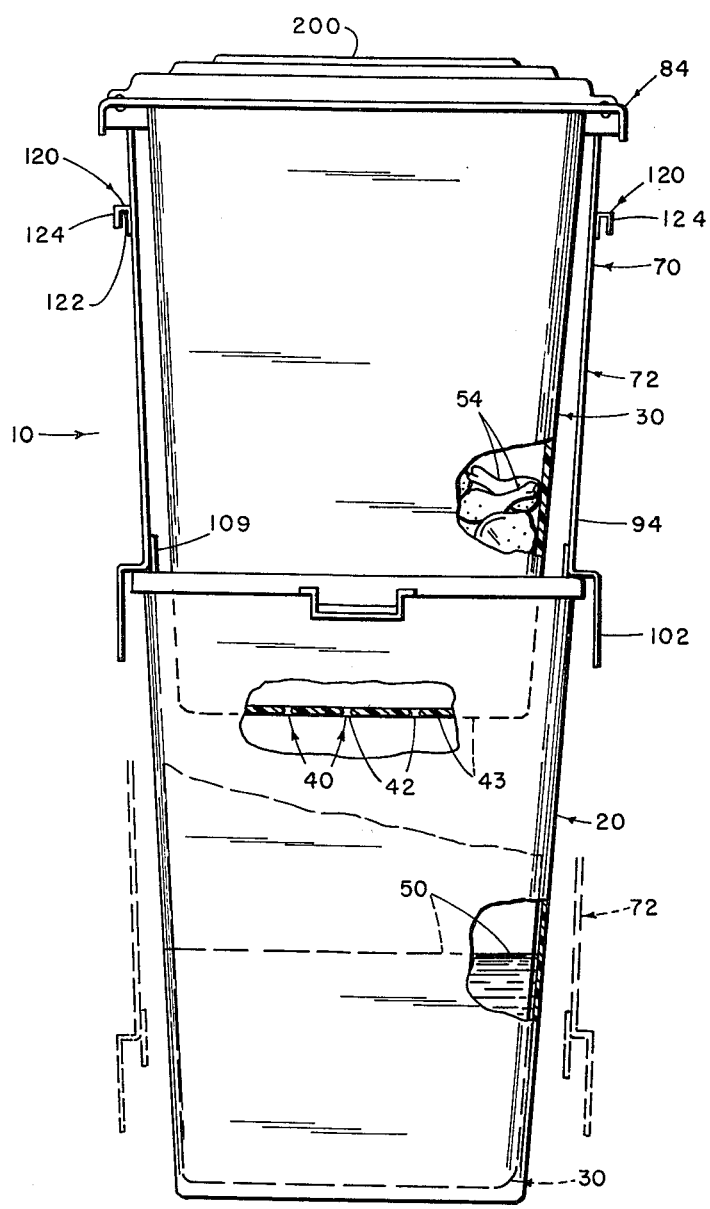
FIG. 1 is a side elevation of my marinade drainer system showing its inner receptacle in an up position in full lines, the supports thereof being partially shown in a down position in dotted lines. A portion of the inner receptacle is broken away to show chicken. A portion of the outer receptacle is broken away to show the level of the marinade.
Figure 2:
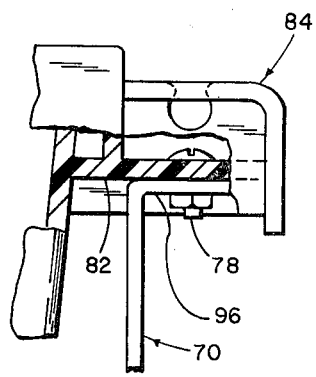
FIG. 2 is a sectional view of the right handle, a portion of which is broken away to show the connection of the support thereto.
Figure 3:
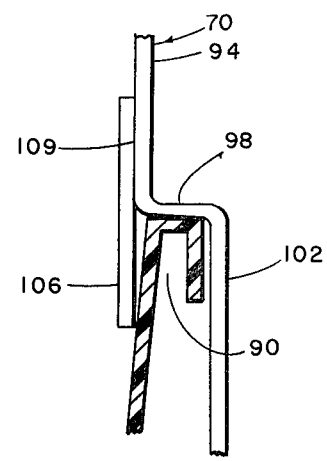
FIG. 3 is a sectional view of the lower portion of a support resting on the rim of the outer receptacle, shown in radial vertical cross section.

The marinade drainer of this invention is generally indicated at 10 in FIG. 1, and comprises an outer receptacle 20, an inner receptacle 30, and having its lower end inside the outer receptacle 20.

The inner receptacle 30 is in a lower position when it is in the position shown in dotted lines in FIG. 1. This lower position can be called the marinating position in which meat is marinated. The inner receptacle 30 has a marinade draining opening assembly, generally indicated at 40, comprising a plurality of elongated slots through a bottom wall 43, such slots being shown at 42 in FIG. 4. The slots 42 are through the bottom of the inner receptacle 30 so as to be through a lower part thereof and be substantially under a level of marinade 50 in the outer receptacle 20 during marinating.

When the receptacle 30 is in the lower marinating position it is adapted to contain meat and marinade, the meat being shown at 54, so that when the inner receptacle 30 is raised to the upper position, then the bottom of the receptacle 30 is above the level of marinade 50, and the marinade can drain out through slots 42 and into the outer receptacle 20, exposing the meat 54 so that it can easily be reached by the operator.

A releasable holding assembly is generally indicated at 70 in FIG. 1, and is operatively correlated with the receptacles 20 and 30 for maintaining the inner receptacle 30 in the upper position. More particularly the releasable holding assembly 70 comprises a pair of supports 72 which are attached at their upper ends to the inner receptacle 30 at an upper portion of the inner receptacle such as by means of bolts 78 fixed to a horizontally extending portion 82 of a handle or projection 84 protruding from a side of the upper receptacle 30.

There are two such handles 84 and one support 72 extends downwardly from one handle and one support extends down from the other. Two supports or handles 84 are on opposite sides of the inner receptacle 30 and the supports 72 are elongated and extend down along respective sides of the inner container 30 and are provided at the lower ends with nothces 90 for receiving the upper edges of opposite sides of the outer receptacle 20. Since the supports 72 are stiff they hold the inner receptacle in the upper position.

The preferred construction is such that a support 72 has a main body portion 94, having an out turned flange 96 at its upper end through which the bolts 78 extend and has an outwardly turned portion 98 at its lower end connected to a downwardly extending portion 102 on the outer side of the notch 90. A wall for the inner side of the notch 90 is formed by an inner wall member 106, suitably fixed to the main portion 94 by a means such as welding at 109.

The main body portion 94 is made of resilient and springy material, preferably stainless steel, and is therefore adapted to sufficiently bend, and even though its normal position is as shown in full lines in FIG. 1 for holding the inner receptacle in the upper position, nevertheless the lower end of the main body portion 94 of each support 72 is adapted to be outwardly flexed sufficient to achieve the dotted line position, shown at 70 in FIG. 1, in which the respective support 72 is disposed along the outer side of the outer receptacle 20 during marinating in the lower position.

A convenient grip 120 is attached by suitable means such as welding at 122 to the outer side of the main portion 94 and the grip 120 is located about two and one-half inches below the horizontally extending portion 82 of the handle 84, whereby it is easy for the operator to lift the inner receptacle 30 by means of lifting upwardly on the grip 120 on each side, while at the same time pressing downwardly with the thumb of each hand on the upper side of the handles 84 so as to cause the support 72 to flex outwardly at its lower end while the inner receptacle is held high enough for the inner wall member 106 to be clear of the outer receptacle 20, whereby the operator can lower the inner receptacle while holding the supports 72 and the result will be that the supports 72 will be held outwardly and away from the outer container 30 as the inner container is lowered for a quick easy and efficient handling of all parts during the fast work needed in the pressure of restaurant food handling.

The upper container can have a lid thereon as indicated at 200 and the lid can be hinged to one or more of the outwardly protruding handles 84 in a manner permitting the lid to also be removed therefrom, but all in a manner not described herein since it is not a part of this invention.

The grips 120 each have a downwardly extending portion 124 at the outer end of the horizontal portion 122 thereof, and preferably extending downwardly approximately one-fourth inch so as to facilitate outward swinging of the respective support when the fingers engage the downwardly extending portion 124 on the inner side thereof during the lowering of the inner receptacle from an upper to a lower position.

Figure 4:
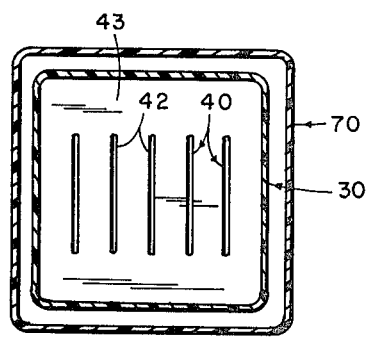
FIG. 4 is a diagrammatic view similar to a horizontal plane cross-section taken closely above the bottom of the inner receptacle and looking downward without showing the inclination of side walls. This view does not show the supports.

It can be seen in FIGS. 1 and 4 that the slots 42 are elongated transversely to the vertical, and that the slots 42 also extend directly downwardly from the top side completely through the bottom side of the inner receptacle bottom wall 43.

The inner and outer receptacles each have upwardly extending walls.

I claim:

1. A chicken marinade drainer comprising: an outer receptacle having upwardly extending outer walls, an inner receptacle inside said outer receptacle and also having upwardly extending outer walls, said inner receptacle being capable of being maintained in a lower marinating position and in an upper draining position, said inner receptacle having a bottom wall extending transversely to the vertical, said bottom wall comprising marinade draining opening means constructed and arranged so as to be substantially under a level of marinade in said outer receptacle during marinating, said inner receptacle when in said lower position being adapted to contain chicken parts and marinade, said inner receptacle being capable of being raised to an upper position with respect to said outer receptacle in which the bottom of said inner receptacle is above the level of marinade in said outer receptacle so marinade can drain out of said opening means into said outer receptacle, said marinade draining opening means comprising a plurality of elongated slots, the elongation of said slots extending transversely to the vertical, said slots also extending directly downwardly from the top side completely through the bottom side of said inner receptacle bottom wall.

2. The chicken marinade drainer of claim 1 having a releasable holding means operatively correlatable between said receptacles for maintaining said inner receptacle in said upper position.

3. The chicken marinade drainer of claim 2 having said holding means comprising two elongated supports on opposite sides of said outer receptacle and having upper ends attached to the upper portion of said inner receptacle, said supports extending downwardly from the upper portion of said inner receptacle and having lower ends resting on an upper portion of said outer receptacle when said inner receptacle is in said upper position.

4. The chicken marinade drainer of claim 1 in which said slots are ¼ inch wide.

* * * * *